United States Patent Office 3,105,519
Patented Oct. 1, 1963

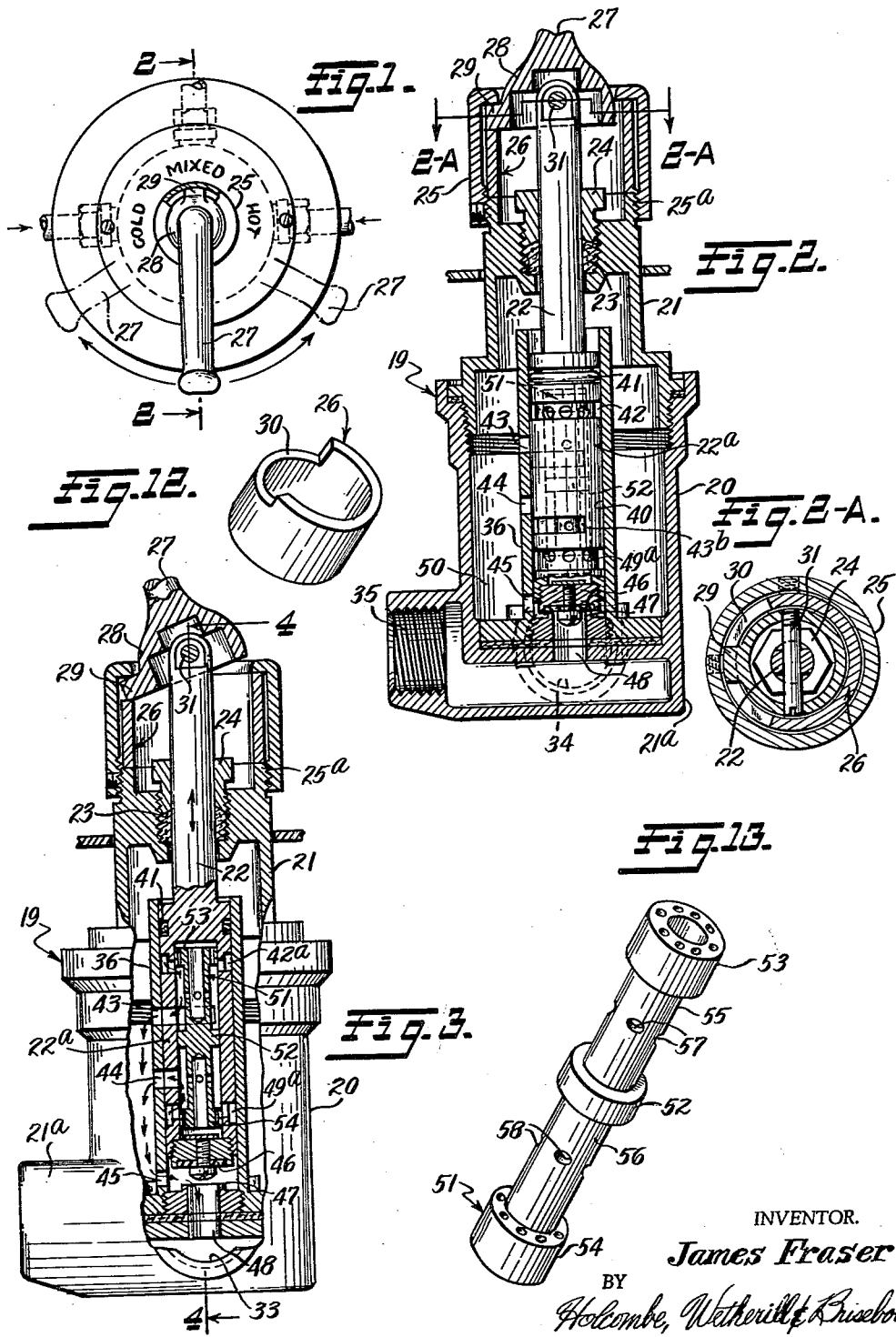

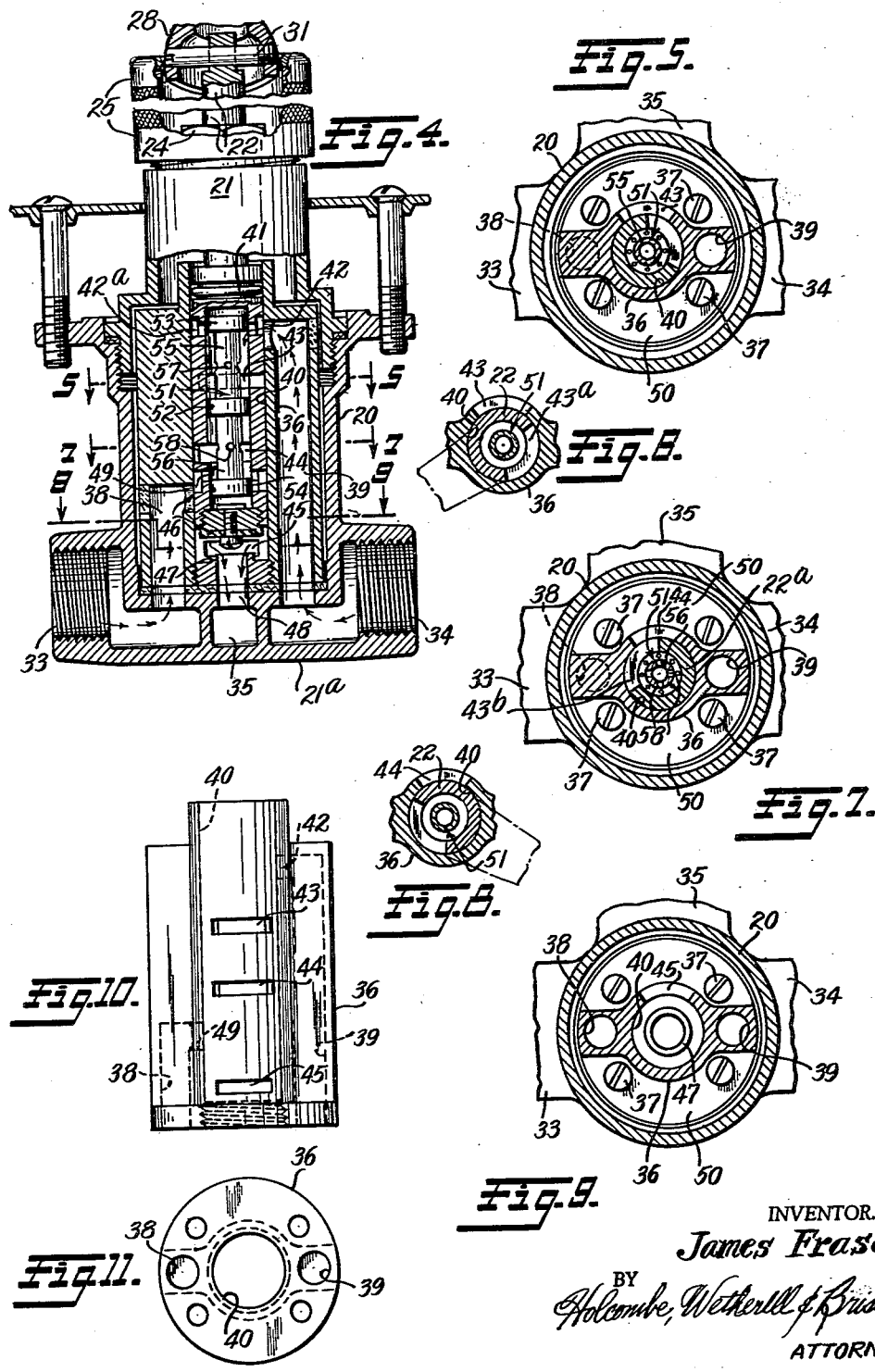

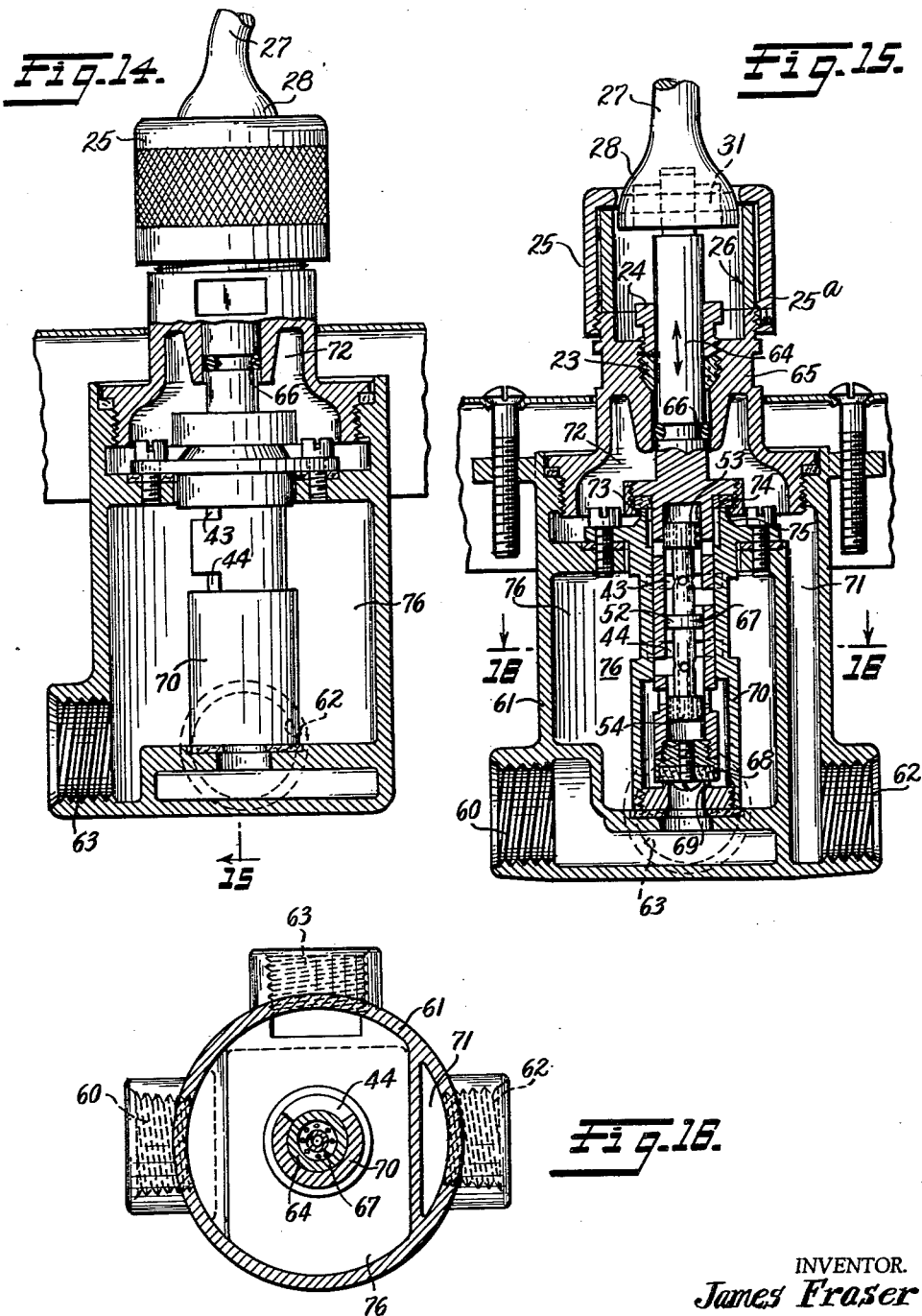

3,105,519
BALANCED PRESSURE MIXING VALVE WITH
SINGLE LEVER FLOW CONTROL
James Fraser, Wilmington, Del., assignor to Speakman
Company, Wilmington, Del.
Filed Jan. 21, 1960, Ser. No. 3,756
10 Claims. (Cl. 137—625.17)

The general object of the present invention is to provide an improved mixing valve of the general type shown in Patent 2,800,137, granted July 23, 1957.

The mixing valve disclosed and claimed in said patent has for its object the mixing of hot and cold water, particularly for use with shower bath installations. When the valve is opened a certain amount of water flows therethrough. The temperature of this water is then regulated, the volume remaining constant.

The present valve has for its object the simultaneous regulation of the volume as well as the simultaneous regulation of the temperature. This is accomplished by means of pressure equalizing means comprising an element ordinarily in the form of a plunger or piston which operates in response to the variations in the relative supply of pressure of the hot and cold water to compensate for the tendency of such relative variations to vary the relative amount of the hot and cold water included in a mixture formed by the valve and given a particular adjustment.

It is a further object of the present invention to provide a valve that will mix hot and cold water and deliver a controlled volume independently of variations in the hot and cold water supply line.

The various features of novelty which characterize this invention are pointed out with particularity in the claims annexed hereto and forming part of this specification. For a better understanding of the invention, its advantages and specific objects obtained by its use, reference should be had to the accompanying drawings and descriptive matter in which have been illustrated and described the preferred embodiment of the invention.

In the drawings:

FIG. 1 is a top plan view of the mixing valve of the present invention.

FIG. 2 is an enlarged fragmentary vertical sectional view substantially on line 2—2 of FIG. 1 showing the valve in a closed position.

FIG. 2A is a horizontal sectional view substantially on line 2A—2A of FIG. 2.

FIG. 3 is a fragmentary vertical sectional view similar to FIG. 2 but showing the valve in open position.

FIG. 4 is a fragmentary vertical sectional view substantially on line 4—4 of FIG. 3.

FIG. 5 is a fragmentary horizontal sectional view substantially on line 5—5 of FIG. 4.

FIG. 6 is a fragmentary diagrammatic horizontal sectional view similar to FIG. 5 showing the cold water inlet port in a closed position.

FIG. 7 is a fragmentary horizontal sectional view substantially on line 7—7 of FIG. 4.

FIG. 8 is a fragmentary diagrammatic horizontal sectional view similar to FIG. 7 showing the hot water inlet port in a closed position.

FIG. 9 is a fragmentary horizontal sectional view through the outlet port substantially on line 9—9 of FIG. 4.

FIG. 10 is a front elevational view of the valve block.

FIG. 11 is a bottom plan view of the valve block of FIG. 10.

FIG. 12 is a perspective view of the swivel for the lever handle.

FIG. 13 is an enlarged perspective view of the floating piston.

FIG. 14 is an enlarged fragmentary vertical sectional view, similar to FIG. 2, illustrating a modified form of the mixing valve.

FIG. 15 is a fragmentary vertical sectional view substantially on line 15—15 of FIG. 14.

FIG. 16 is a horizontal sectional view substantially on line 16—16 of FIG. 15.

The embodiments of the present invention are illustrated and described. The first embodiment has a single valve closure means and is illustrated in FIGS. 1 to 13, inclusive.

Referring particularly to the drawings, a valve body 19, shown in FIG. 2, has an intermediate portion 20, a top portion 21 threadedly mounted thereon, and a lower portion 21ª, integral with the intermediate portion. A valve stem 22 is retained within the central axis of this top portion in watertight relation thereto by means of the packing 23 and the gland nut 24. A hood or cap member 25 is threadedly mounted on top of the top portion 21. Within the hood is a ring 26 shown in detail in FIG. 12, having a groove 30 cut into the side thereof. The handle 27 has an enlarged portion 28 fitting within the ring 26 and has a lug 29 on the opposite end from the extension. This lug is retained within the central groove 30 within the ring 26. The handle 27 is fastened to the valve stem by means of the pivot 31 which is inserted in the ring 26. The lug 29 gives a fulcrum point about which the handle operates when it is raised and lowered to lift and lower the valve stem 22, and the ring forms a hollow hub or sleeve which permits the handle to swing about the axis of the valve stem 22. When such swinging movement takes place by forcing the handle sidewise the ring 26 turns about the top portion 21 except when tightened in position by screwing down the hood 25. Thereby the valve stem has imparted to it two different types of motion by means of the handle 27. One is a vertical motion and the other is a rotating motion. As will be more fully explained later, the vertical motion controls the volume of the water and the lateral motion controls the temperature of the water.

Referring to FIGS. 2 and 3 it will be clearly seen that lug 29 is adapted to bear on the lower edge of the groove 30 of ring member 26. If now the handle is lifted, the point of contact of the lug on groove 30 serves as the fulcrum of a lever composed of a short arm terminating in lug 29, and a long arm terminating in handle 27, whereby valve stem 22 and hollow valve member 22ª may be moved in a vertical direction. It will further be seen that when the handle is swung to the left or right, the sides of groove 30 limit the distance through which lug 29 may move, and the corresponding distance through which handle 27 may be rotated together with stem 22 and hollow valve member 22ª. By loosening the hood or cap member 25 the ring 26 may be freely rotated to any desired position. The ring then may be fixed in position by tightening down cap member 25 so that the lower edge of the ring seats frictionally on shoulder 25ª. When so fixed the ring and lug serve to set the maximum and minimum openings of metering ports 43 and 44, and the resulting proportionate flow of hot and cold water therethrough as reflected by the temperature of the mixture issuing from outlet passage 35.

The lower portion of the valve body 19 has a lower hot water inlet 33 and a lower cold water inlet 34 on each side thereof and an intermediate outlet passage 35 therebetween, generally similar to the arrangement in Patent 2,800,137. The valve body has a chambered block 36 (shown in FIG. 10) mounted therein, as shown in FIGS. 5, 7 and 9, by means of the screws 37, 37, which secure its lower flange to the bottom wall of the intermediate chamber 20 of the valve body. This valve block (shown in section in FIG. 4) has a conduit 38 connected to the hot water inlet 33 and a conduit 39 connected to the cold water inlet 34, and is provided with a central chamber 40 which receives the hollow valve member 22ª which is operatively connected to the valve stem 22. This hollow valve member is a close fit in the valve block, being held in water-tight engagement for rotating and axial movement therein by means of the O-ring packing member 41, at all times. The hollow valve member 22ª is provided with a cold water outlet metering port 43ª, and a hot water outlet metering port 43ᵇ. The valve block 36 has a cold water inlet passage 42 near the top thereof connecting with the cold water inlet conduit 39, and a cold water metering port 43 therebelow, which registers with the cold water metering port 43ª, forming therewith an adjustable opening for controlling the flow of cold water therethrough. Below this cold water metering port 43 in the valve block is a hot water metering port 44 which registers with the hot water metering port 43ᵇ, forming therewith an adjustable opening for controlling the flow of hot water therethrough, and a hot and cold water outlet port 45 below said hot water metering port.

A hot water inlet passage 49 connects the conduit 38 with the central chamber 40 and thereby maintains communication between it and the hot water supply entering the inlet 33. The metering ports 43, 44 discharge into the mixing chamber 50, and the outlet port 45 leads from this chamber to the shut off valve 47.

The bottom of the hollow valve stem 22 is closed by a screw plug having the usual elastomeric valve member 46 thereon which normally contacts the valve seat 47 axially located below the valve stem. This valve seat 47 surrounds the conduit 48 leading to the exhaust passage 35 (shown in FIGS. 2 and 4), thereby connecting the latter with the chamber 50. The mixing chamber 50 is located within the intermediate portion 20 on both sides of the chambered block 36.

Within the hollow valve member 22ª, and separating the hot and cold water flow therethrough is a floating piston element 51 having a central enlarged portion 52 and the enlarged end portions 53 and 54. The smaller portions 55 and 56 of the piston element which separate those enlarged portions provide spaces for the cold and hot water to flow into and move the piston element one way or the other until the pressure in these spaces is equalized. The enlarged portions fit in substantially water-tight engagement with the inside bore of the valve member 22ª and separate the cold and hot water inlets 42 and 49, as shown in FIG. 4. The piston element has conduits 57 and 58 therethrough, as shown in FIG. 13, connecting the portions of reduced diameter with the ends of the piston and allowing the equalization of the water pressure on each end of the piston. Thus the piston is in floating engagement with the inside of the valve stem, and automatically adjusts its position to cut off more or less water from one or the other supply as necessary to maintain its equilibrium with changes in the pressure of either supply, as hereinafter described.

When the valve is assembled, as shown in FIGS. 1, 2, 3 and 4, and the handle is placed in the lower central position, as shown in FIG. 2, the valve element 46 contacts the valve seat 47 and prevents water from flowing therethrough. When this handle is raised, as shown in FIG. 3, the water will flow as illustrated through the hot water and cold water ports respectively into the mixing chamber and the piston element 51 will ride within the hollow stem, as shown, so long as the cold and hot water is admitted at equal pressure. When the pressure varies so that the hot water has less pressure than the cold water, the piston element 51 will be forced downwardly by the unbalanced pressure acting on the central portion 52. This will partially close the cold water port 42 and open the hot water port 49 until the balance of pressure is established and will maintain it thereafter in balanced relation.

When the handle 27 is rotated to the right, as shown in dotted lines in FIG. 1, this will rotate the valve step 22 and expose less of the cold water metering port and more of the hot water metering port, thereby regulating the temperature of the water flowing through the valve. This is shown in FIG. 5 which is a section showing the cold water metering port 42 in the partly open position, and in FIG. 7, which is a section showing the hot water metering port in the partly closed position, as is the case with the handle 27 at its intermediate position as shown in FIGS. 1, 5 and 7. When the handle is turned to the left or to the right, as shown in FIGS. 6 and 8, respectively, these conditions are altered and there is less of the cold water metering port open and more of the hot water metering port open, and vice versa, depending on the direction in which the handle 27 is turned.

The above valve arrangement has the advantage of requiring only a single valve element for controlling both the volume of flow and also the temperature of the water, all regulated through the same control means, moving one single handle to turn on, turn off and adjust the temperature of the delivered water as desired, and will compensate automatically for changes in pressure between the hot and cold water so as to prevent a surge of hot water if the cold water line decreases in pressure.

A second modification of this invention is shown in FIGS. 14, 15 and 16. The hot water inlet 60 (shown in FIG. 16), is formed in one piece with the valve body 61 and likewise the cold water inlet 62 on the opposite side of the valve body near its lower end. The mixture delivery passage 63 is located therebetween. This valve arrangement has the valve stem 64 centrally located therein and maintained in water-tight engagement with the upper portion of the cap 65, by means of the O-ring packing member 66 and is controlled by means of a single handle 27 pivotally mounted and arranged as described in the first modification of the valve. The handle operates in the same manner to control the volume by raising and lowering the handle and to control the temperature by rotating the handle to one side or the other. The valve stem 64 has the same hollow bore therein with a similar floating piston element 67 as is described for the perior modification, but in this modification the valve stem has its lower valve element 68, which engages the lower valve seat 69 of the block 70, controlling the flow of hot water from the hot water inlet 60 to the lower chamber in the block 70. The cold water entering through the cold water inlet 62 flows through the chambers 71 in the valve body and into the upper chamber 72 in the cap 65, and is admitted to the cold water inlet port 73 at the upper end of the block 70 by means of the valve element 74 when it is lifted off of the valve seat 75. When this control valve is assembled, as shown in FIG. 15, the cold water is positively retained within the cold water chamber 72 and the hot water likewise is retained in the hot water inlet passage 60 by the respective valves 74 and 68 when in the closed position, thereby preventing bleeding from the hot to the cold water inlets respectively, and conserving the supply of hot water. On opening this control valve both of these valve elements rise simultaneously and admit the water to both the cold and the hot water sides of the control valve, which operates in the same manner as that described for the first modification, the water flowing from the hot and the cold water inlet passages to the mixing chamber 76 in the valve body and out through the delivery passage 63, surges in the pressure of either the cold or the hot water supply being equalized by the equalizing piston 67 as heretofore described for the piston 51.

This application is a continuation-in-part of my application Serial No. 762,842, filed September 23, 1958 (now abandoned).

While in accordance with the provisions of the statutes there has been illustrated and described the best forms and embodiments of this invention, it will be apparent to those skilled in the art that changes may be made in the forms of the apparatus disclosed, without departing from the spirit of this invention as set forth in the appended claims, and that in some cases certain features may be used without a corresponding use of other features.

What is claimed is:

1. In a mixing valve for hot and cold water comprising a hollow body having a central passage, a rotable and axially slidable hollow valve member fitting in said central passage with means to control the inflow of hot and cold water with rotation of said valve member in a manner that rotation in one direction increases the percentage of cold water to hot water, and in the other direction increases the percentage of hot water to cold water, a sleeve member revolvably mounted on said body for movement around the axis of said valve member, said sleeve member having a slot of limited arcuate extent in the upper part thereof, a lever provided with a handle at one end, and having an enlarged portion remote from said handle and projecting into and loosely embraced by said sleeve member, a pivot connection between the enlarged portion of said lever and said valve member, and a short arm projecting from said lever to one side of said axis, said arm bearing a lug, said lug being movably positioned in said slot and contacting with the limiting ends of the slot to limit the rotational movement of the lug and valve member, whereby said handle may be moved lengthwise and angularly with respect to said axis to adjust said valve member both axially and angularly independently and conjointly as desired, and a cap member surrounding said sleeve member and holding it in operating position.

2. In a mixing valve for hot and cold water comprising a hollow body having a central passage, a rotatable and slidable hollow valve member fitting in said central passage with means to control the inflow of hot and cold water with rotation of said valve member in a manner that rotation in one direction increases the percentage of cold water to hot water and in the other direction increases the percentage of hot water to cold water, a ring-shaped sleeve revolvably mounted on said body for movement around the axis of said valve member, said sleeve having a slot of limited arcuate extent extending partially around the circumference of said sleeve, a lever provided with a handle at one end, and having an enlarged portion remote from said handle and projecting into and loosely embraced by said sleeve, said lever having a pivot adjacent said enlarged portion, said pivot connecting said lever to said hollow valve member, and a short arm projecting from said enlarged portion of said lever to one side of said axis, said arm bearing a lug, said lug fitting loosely within said slot and contacting with the limiting ends of the slot to limit the rotational movement of the lug and valve member and limiting the vertical and lateral movements of said lever, and a cap member surrounding said sleeve, said cap member being provided with threads engaging corresponding threads on said hollow body, said cap when loosened permitting rotary adjustment of said sleeve member, and when tightened bearing on said sleeve member and preventing movement of said sleeve member.

3. A mixing valve as set forth in claim 2 wherein said lug is located on the fulcrum of said lever.

4. In a mixing valve for hot and cold water comprising a hollow body having a central passage, a rotatable and slidable hollow valve member fitting in said central passage, with means to control the inflow of hot and cold water with rotation of said valve member in a manner that rotation in one direction increases the percentage of cold water to hot water and in the other direction increases the percentage of hot water to cold water, a stem operatively connected to said hollow valve member in axial alinement therewith, a ring-shaped sleeve revolvably mounted around said stem and seating on a shoulder within said hollow body, said sleeve being substantially co-axial with said hollow valve member and said stem, said sleeve being provided with a slot of limited arcuate extent extending partially around the circumference of said sleeve, a manually operable lever having a long arm extending outside said hollow body, and a short arm extending within said hollow body, and a pivot connecting said lever to said stem, said short arm bearing a lug, said lug fitting loosely within said slot and contacting with the limiting ends of the slot to limit the rotational movement of the lug and valve member and limiting the vertical and lateral movements of said lever, and a cap member with threads engaging corresponding threads on said hollow body, said sleeve being positioned within said cap, said lug being located at the fulcrum point of said lever, said cap when loosened permitting rotary adjustment of said sleeve member, and when tightened bearing on said sleeve member and preventing movement of said sleeve member.

5. In an actuator comprising a hollow valve body having a central passage, a rotatable and axially slidable hollow valve member fitting in said central passage, with means to control the inflow of hot and cold water with rotation of said valve member in a manner that rotation in one direction increases the percentage of cold water to hot water and in the other direction increases the percentage of hot water to cold water, a sleeve member revolvably mounted on said body for movement about the axis of said valve member, said sleeve member having a slot of limited arcuate extent in the upper part thereof, a lever provided with a handle at one end and having an enlarged portion remote from said handle projecting into and loosely embraced by said sleeve member, a pivot connection between the enlarged portion of said lever and said valve member and a short arm projecting from said lever to one side of said axis, said arm bearing a lug, which lug is movably positioned in said slot and contacting with the limiting ends of the slot to limit the rotational movement of the lug and valve member, whereby said handle may be moved lengthwise and angularly with respect to said axis to adjust said valve member both axially and angularly, independently and conjointly as desired, and a cap member surrounding said sleeve member and holding it in operating position.

6. In an actuator comprising a hollow valve body having a central passage, a rotatable and axially slidable hollow valve member fitting in said central passage, with means to control the inflow of hot and cold water with rotation of said valve member in a manner that rotation in one direction increases the percentage of cold water to hot water and in the other direction increases the percentage of hot water to cold water, a sleeve member revolvably mounted on said body for movement about the axis of said valve member, said sleeve member having a slot of limited arcuate extent in the upper part thereof, a lever provided with a handle at one end and having an enlarged portion remote from said handle projecting into and loosely embraced by said sleeve member, a pivot connection between the enlarged portion of said lever and said valve member and a short arm projecting from said lever to one side of said axis, said arm bearing a lug, which lug is movably positioned in said slot and contacting with the limiting ends of the slot to limit the rotational movement of the lug and valve member, whereby said handle may be moved lengthwise and angularly with respect to said axis to adjust said valve member both axially and angularly, independently and conjointly as desired, and a cap surrounding said sleeve, said cap member being provided with threads engaging said corresponding threads on said hollow body, said cap when loosened permitting rotary adjustment of said sleeve member and when tightened bearing on said sleeve member and preventing movement of said sleeve member.

7. An actuator as set forth in claim 6 wherein said lug is located on the fulcrum of said lever.

8. In an actuator comprising a hollow valve body having a central passage, a rotatably and axially slidable hollow valve member fitting in said central passage, with means to control the inflow of hot and cold water with rotation of said valve member in a manner that rotation in one direction increases the percentage of cold water to hot water and in the other direction increases the percentage of hot water to cold water, a stem operatively connected to said hollow valve member in axial alinement therewith, a ring shaped sleeve revolvably mounted around said stem and seated on a shoulder within said hollow valve body, said sleeve being substantially co-axial with said hollow valve member and said stem, said sleeve being provided with a slot of limited arcuate extent extending partially around the circumference of said sleeve, a manually operable lever having a long arm extending outside of said hollow body and a short arm extending within said hollow body and a pivot connecting the said lever to said stem, said short arm bearing a lug, said lug fitting loosely within said slot and contacting with the limiting ends of the slot to limit the rotational movement of the lug and valve member and limiting the vertical and lateral movement of said lever, a cap member with threads engaging corresponding threads on said hollow body, said sleeve being positioned within said cap member, said lug being located at the fulcrum point of said lever, said cap when loosened permitting rotary adjustment of said sleeve member and when tightened bearing on said sleeve member and preventing movement of said sleeve member.

9. In a mixing valve for hot and cold water, comprising a hollow body having a central passage with inlet ports for hot and cold water and an outlet port for mixed water, a rotatably and axially slidable hollow valve member fitting in said central passage with means to control the inflow of hot and cold water with rotation of said valve member in a manner that rotation in one direction increases the percentage of cold water to hot water and in the other direction increases the percentage of hot water to cold water, said slidable valve member having a resilient member on the bottom portion thereof to contact a valve seat in said body to control the flow of water therefrom, a sleeve member revolvably mounted on said body for movement around the axis of said valve member, said sleeve member having a slot in the upper part thereof of limited arcuate extent, a lever provided with a handle at one end, and having an enlarged portion remote from said handle and projecting into and loosely embraced by said sleeve member, a pivot connection between the enlarged portion of said lever and said valve member, and a short arm projecting from said lever to one side of said axis, said arm bearing a lug, said lug being movably positioned in said slot and contacting with the limiting ends of the slot to limit the rotational movement of the lug and valve member, whereby said handle may be moved lengthwise and angularly with respect to said axis to adjust said valve member both axially and angularly independently and conjointly as desired, and a cap member surrounding said sleeve member and locking it in a predetermined operative position.

10. In a mixing valve for hot and cold water, comprising a hollow body having a central passage with inlet ports for hot and cold water and an outlet port for mixed water, a rotatably and axially slidable hollow valve member fitting in said central passage with means to control the inflow of hot and cold water with rotation of said valve member, in a manner that rotation in one direction increases the percentage of cold water to hot water and in the other direction increases the percentage of hot water to cold water, said slidable valve member having a resilient member on the bottom portion thereof to contact a valve seat in said body to control the flow of water therefrom, a sleeve member revolvably mounted on said body for movement around the axis of said valve member, said sleeve member having a slot in the upper part thereof of limited arcuate extent, a lever provided with a handle at one end, and having an enlarged portion remote from said handle and projecting into and loosely embraced by said sleeve member, a pivot connection between the enlarged portion of said lever and said valve member, and a short arm projecting from said lever to one side of said axis, said arm bearing a lug, said lug fitting loosely within said slot and contacting with the limiting ends of the slot to limit the rotational movement of the lug and valve member and limiting the vertical and lateral movement of said lever, and a cap member with threads engaging corresponding threads on said hollow body, said sleeve being positioned within said cap, said lug being located at the fulcrum point of said lever, said cap when loosened permitting rotary adjustment of said sleeve member and when tightened bearing on said sleeve member and preventing movement of said sleeve member.

References Cited in the file of this patent

UNITED STATES PATENTS

| | | |
|---|---|---|
| 2,267,976 | Hermann | Dec. 30, 1941 |
| 2,647,529 | Wall | Aug. 4, 1953 |
| 2,650,604 | Barnett | Sept. 1, 1953 |
| 2,757,687 | Moen | Aug. 7, 1956 |
| 2,762,225 | Robertson | Sept. 11, 1956 |
| 2,800,137 | Fraser | July 23, 1957 |
| 2,800,923 | Russell | July 30, 1957 |
| 2,890,720 | Moen | June 16, 1959 |
| 2,978,917 | Moen | Apr. 11, 1961 |